United States Patent
Carter

[15] 3,678,314
[45] July 18, 1972

[54] DISCOIDAL ELECTRIC MOTOR

[72] Inventor: Alastair Howroyd Carter, Two Willows, The Crescent, Hampton-in-Arden, England

[22] Filed: June 17, 1970

[21] Appl. No.: 47,099

Related U.S. Application Data

[63] Continuation-in-part of Ser. No. 727,208, May, 1968, abandoned.

[52] U.S. Cl. ....................................................310/268
[51] Int. Cl. ..............................................H02k 1/22
[58] Field of Search ..........................310/268, 154, 43

[56] References Cited

UNITED STATES PATENTS

| | | | |
|---|---|---|---|
| 376,307 | 1/1988 | Jehl | 310/268 X |
| 534,953 | 2/1895 | Eickemeyer | 310/268 X |
| 1,038,494 | 9/1912 | Nelson | 310/268 X |
| 3,226,586 | 12/1965 | Henry-Baudot | 310/268 X |
| 3,315,106 | 4/1967 | Reynst | 310/268 |
| 3,348,086 | 10/1967 | Monma | 310/268 |
| 3,401,286 | 9/1968 | French | 310/268 |
| 3,441,763 | 4/1969 | Patrignani | 310/268 X |
| 3,450,909 | 6/1969 | Burr | 310/268 X |
| 3,525,008 | 8/1970 | Burr | 310/268 |

*Primary Examiner*—D. F. Duggan
*Attorney*—Holman & Stern

[57] ABSTRACT

An electric motor has a disc-shaped armature consisting of a plurality of overlapping coils lying in the general plane of the disc, each coil having a plurality of turns. Each coil has radial runs of wire lying side by side in the plane of the disc and interconnecting ends lying side by side in a tangential plane. The coils nest together in an annular array with one radial run of each coil lying directly over and closely adjacent a radial run of another coil spaced by several intervening coils in the array. The whole armature is encapsulated in a mass of a synthetic resin material with the outer ends of the coils lying in an outer ring of the mass, the inner ends of the coils lying in an inner ring of the mass and a thin disc portion of the mass enclosing the radial runs of the coils. There is a commutator connected to the coils and co-acting with brushes and a fixed pole structure having pole faces closely adjacent the thin disc portion of the encapsulating mass.

9 Claims, 7 Drawing Figures

INVENTOR
ALISTAIR HOWROYD CARTER
ATTORNEYS

INVENTOR
Alastair Howroyd Carter

ATTORNEYS

DISCOIDAL ELECTRIC MOTOR

This application is a continuation-in-part of application Ser. No. 727,208 filed May 7, 1968, now abandoned.

BACKGROUND OF INVENTION

This invention relates to electric motors of the disc armature type.

Disc armature motors are generally only employed for low torque application. It has been realized, however, that there are many possible applications for high torque disc armature electric motors such as wheel motors for electric cars and electric grass cutting machines.

Most of the prior art motors, being intended for low horsepower applications, cannot conveniently be scaled up to meet the requirements of the high horsepower motor. For obtaining the best effect from given magnets, it is necessary for the armature of the motor to be so constructed that a maximum quantity of radially extending conductive wires can be incorporated in a disc of the minimum possible thickness in the region of the magnets.

SUMMARY OF THE INVENTION

The invention provides an armature which consists of an annular array of nesting coils each having a plurality of turns in the plane of the armature. Each coil has two radial runs which lie flat in the plane of the armature and end sections perpendicular to the plane of the armature. The two radial runs of each coil are of different lengths and the shorter directly overlies the longer radial run of another coil spaced from the first-mentioned coil by a plurality of intervening coils in the array. The whole armature is encapsulated in a mass of synthetic resin material including an outer ring and an inner ring, which respectively enclose the ends of the coils, and a thin disc portion between the rings, enclosing the radial runs of the coils.

Figure 1:
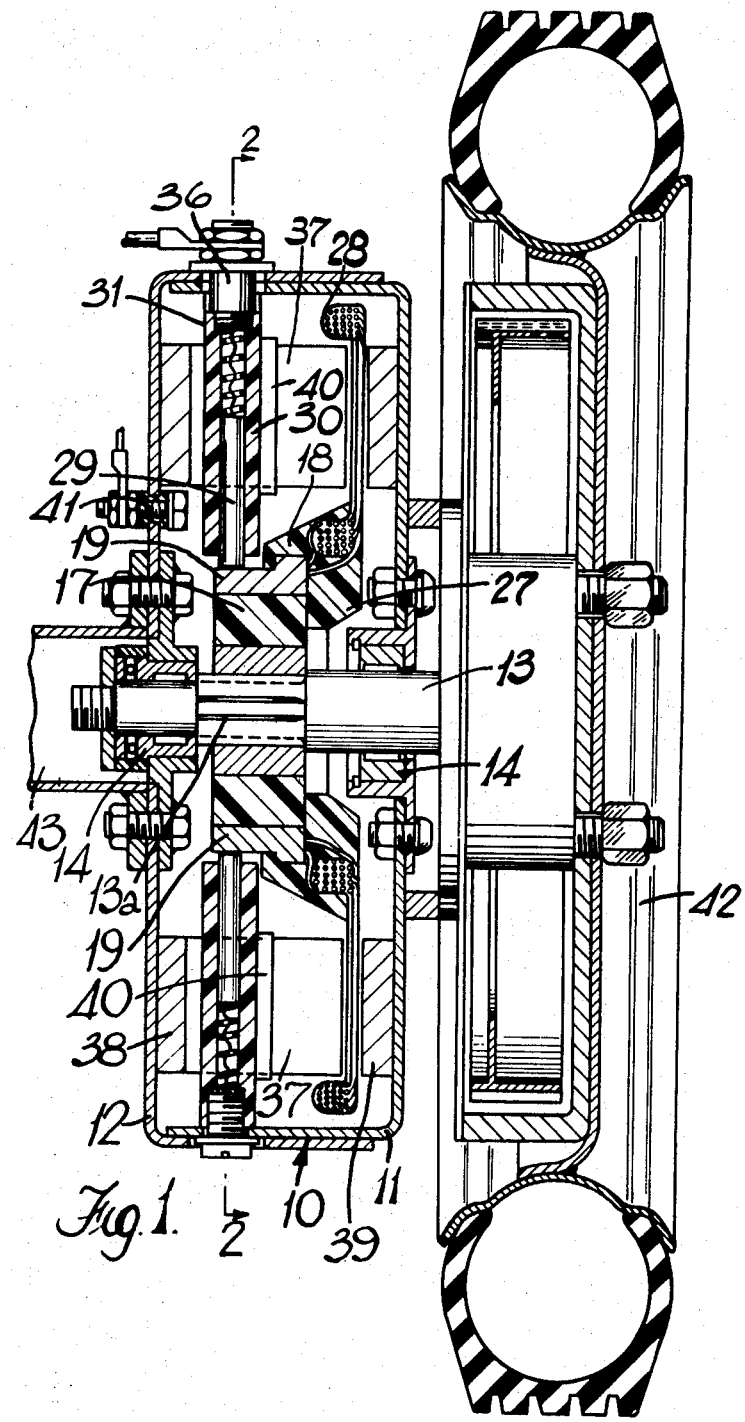
FIG. 1 is a section through a wheel unit for an electrically powered road vehicle incorporating an example of an electric motor in accordance with the invention.
Figure 2:
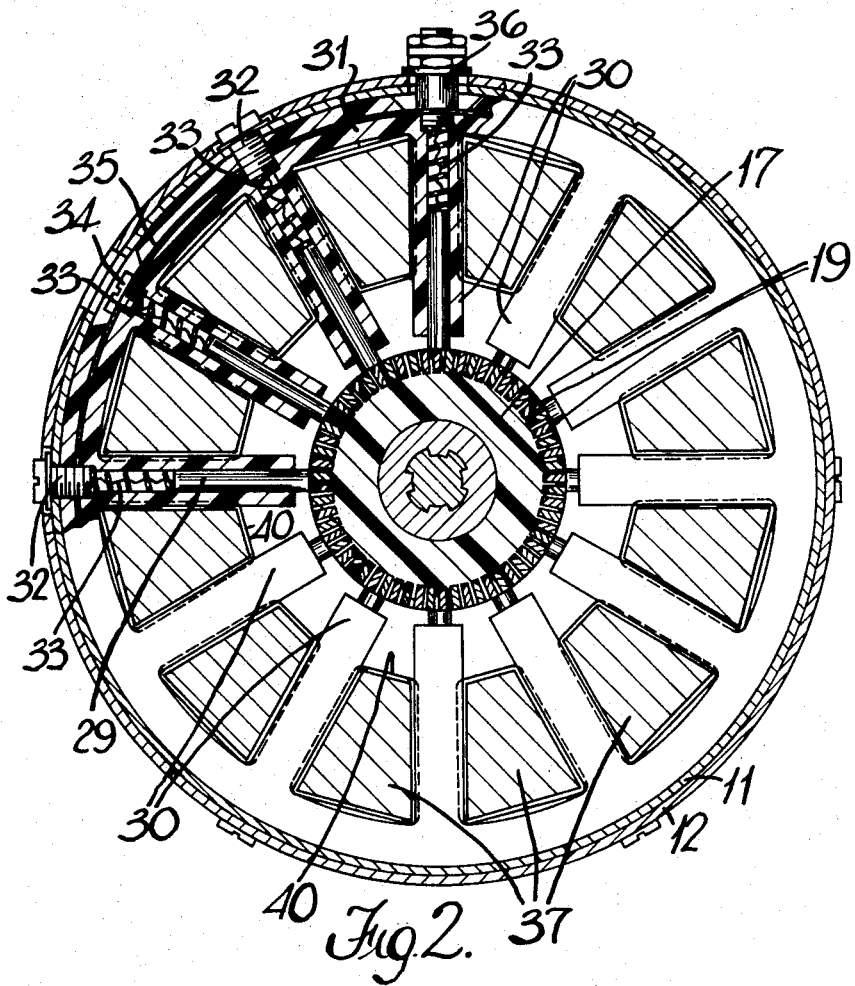
FIG. 2 is a section on line 2—2 in FIG. 1.
Figure 3:
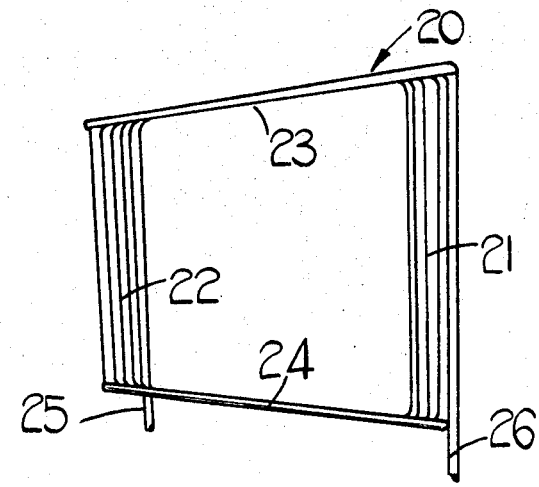
FIG. 3 is a view showing a coil used in the construction of the armature of the motor.

DETAILED DESCRIPTION OF PREFERRED EMBODIMENTS.

Referring firstly to FIGS. 1 to 5 of the drawings, the motor shown includes a housing 10 comprising two cup-shaped metal parts 11, 12 one of which fits within the other. A shaft 13 is supported by the housing by means of a needle journal bearing 14 on the part 11 and a combined needle journal and ball thrust bearing 15 on the part 12. The shaft 13 has a splined portion 13a intermediate these bearings.

The shaft carries an electrically insulative commutator barrel 17 to which there is secured an armature disc 18. The commutator incorporates a series of electrically conductive strips 19. In the motor actually shown there are 61 such strips 19 which are all identical and are equiangularly spaced around the axis of shaft 13.

Figure 4:
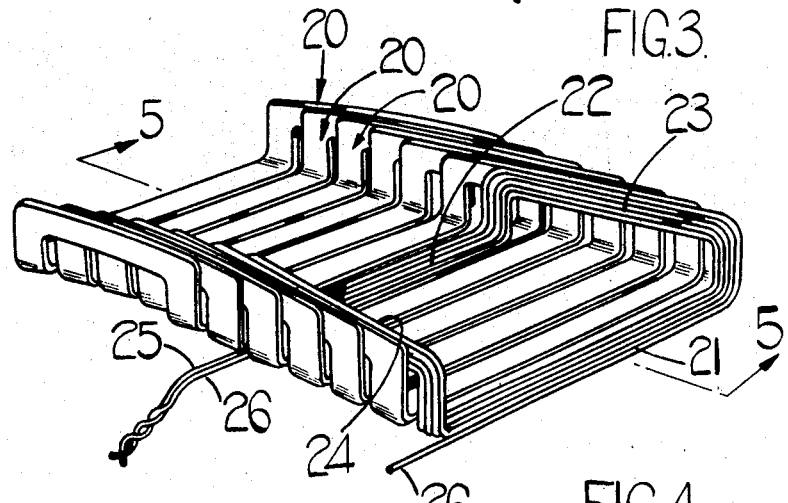
FIG. 4 is a perspective view showing part of an annular array of the coils of FIG. 3.
Figure 5:
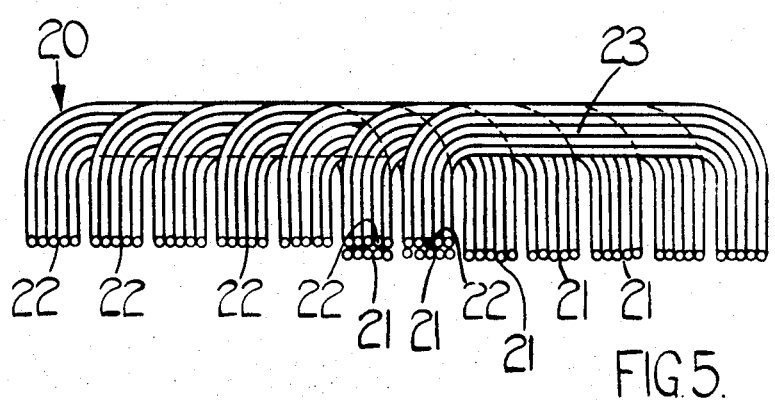
FIG. 5 is a section on line 5—5 in FIG. 4.

The armature 18 is assembled from a plurality of separate coils 20, each consisting of a pair of sides 21, 22 extending radially from the axis of the armature, with the side 21 being longer than the side 22, commencing radially closer to the axis of the armature and terminating radially further from such axis. The sides 21, 22 are interconnected by ends 23, 24, and the end 23 is longer than the end 24. The coil 20 does not lie in a plane, since portions of the sides adjacent the ends are bent up. This arrangement enables the coils 20 to nest together in an annular array (as shown in FIG. 4) with the ends 23, 24 of each coil fitting between the ends of an adjacent coil and with the sides 22 lying in a plane overlying the plane of the sides 21. In fact, there are 61 of the coils and these are so arranged that the side 21 of each coil directly underlies and is closely adjacent the side 22 of another coil separated from the first-mentioned coil in the annular array by four intervening coils.

Each coil consists of four complete turns and an incomplete turn such that there are five runs of wire in each of the sides 21, 22 and in the end 23, but only four runs in the end 24. Each coil is wound with the turns flat in the plane of the armature in the sides 21, 22. The inner wire in the side 22 is extended beyond the end 24 to form a connecting portion 25 and the outer wire in the side 21 is extended to form a connecting portion 26. These are connected by soldering or otherwise to the commutator strips 19 such that the two connecting portions 25, 26 are connected to two strips 19 separated by nine intervening strips 19. The connecting portions 25, 26 of a side 22 of one coil and the underlying side 21 of the coil separate therefrom by four intervening coils are both connected to the same commutator strip 19.

The coils 20 are assembled in the above described arrangement on a suitable jig and are then temporarily connected together by tying with strings around the inner end and around rims formed respectively by the sides 24, 23 respectively. The coils are then encapsulated in a suitable synthetic resin material such as a catalytic curing epoxy resin. The two rims mentioned are enclosed in substantial inner and outer rings 27, 28 respectively, of the resin while the disc formed by the double layer of the sides 21, 22 of the coils is only given a thin protective and rigidifying coating which is preferably loaded with iron dust to give this area of the encapsulation desirable magnetic properties. The inner ring 27 is firmly bonded to the commutator so as to be drivingly connected to the shaft 13.

For supplying current to the commutator 17 there are a plurality of brushes 29. These brushes extend radially and are of considerable length. The brushes 29 are telescopically received by insulative sockets 30, of appropriate cross-section, integrally formed on a ring 31 of insulation material. Alternate brushes 29 are connected by pigtails 33 and screws 32 to the housing part 11. The remaining brushes (except for one) are connected by pigtails 33 and screws 34 to a conductor 35 set in the ring 31 and insulated from the casing 10. The last remaining brush 29 is connected by its pigtail 33 to a terminal 36 engaging the ring 31 and projecting through an opening in the housing 10 to allow an external connection to be made thereto.

The housing supports a pole structure constituted by a ring of twelve permanent magnets 37 located respectively between the sockets 30 and extending axially with respect to the shaft 13. The magnets 37 have pole faces closely adjacent the disc portion of the armature and are carried on a magnetic ring 38 fixed to the casing. A second magnetic ring 39 extends on the side of the armature remote from the magnets 37. The magnets 37 are magnetized in situ in the motor so that alternate magnets present south pole faces to the armature and the remaining magnets present north pole faces to the armature. Each pair of adjacent magnets is therefore part of a magnetic circuit including the two rings 38, 39 and two air gaps in which the armature is situated.

When current is passed through the motor by applying a d.c. voltage between the terminal 36 and the casing 10, the armature, and thus the shaft 13, is caused to rotate. As a result of the use of separate multi-turn coils in the armature, a relatively high torque is applied to the armature as compared with known motors with disc-type armatures.

To prevent de-magnetization of the permanent magnets 37 there are a plurality of magnetization coils 40 on the magnets 37 respectively. These each consist of a few turns of wire an are wound alternately in opposite senses to provide alternately reversed magnetizing fields. These coils may be formed from a single length of wire so that the coils, are, in fact, in series.

One end of the wire is connected to an external terminal 41 on but insulated from the casing and the other is connected to the terminal 36. For initial magnetization of the magnets, a d.c. voltage is applied to the terminals 36, 41. Thereafter, the terminal 41 is employed for energizing the motor so that the armature current flows through the coils 40 in series. Thus, when the current is high, as during starting, the field set up by the magnetizing coils 40 will counteract the de-magnetizing effect of the armature field.

FIG. 1 shows the motor as used for the direct driving of a road vehicle wheel 42. The housing 10 is directly bolted to a conductive beam axle 43 which supports both motor/wheel units of the vehicle. The terminals 41 of the two motors are connected to the battery terminals, so that the motors are in series between the batteries. The pole arrangements in the two motors are reversed so that the two wheels 42 are driven in the same direction.

Figure 6:
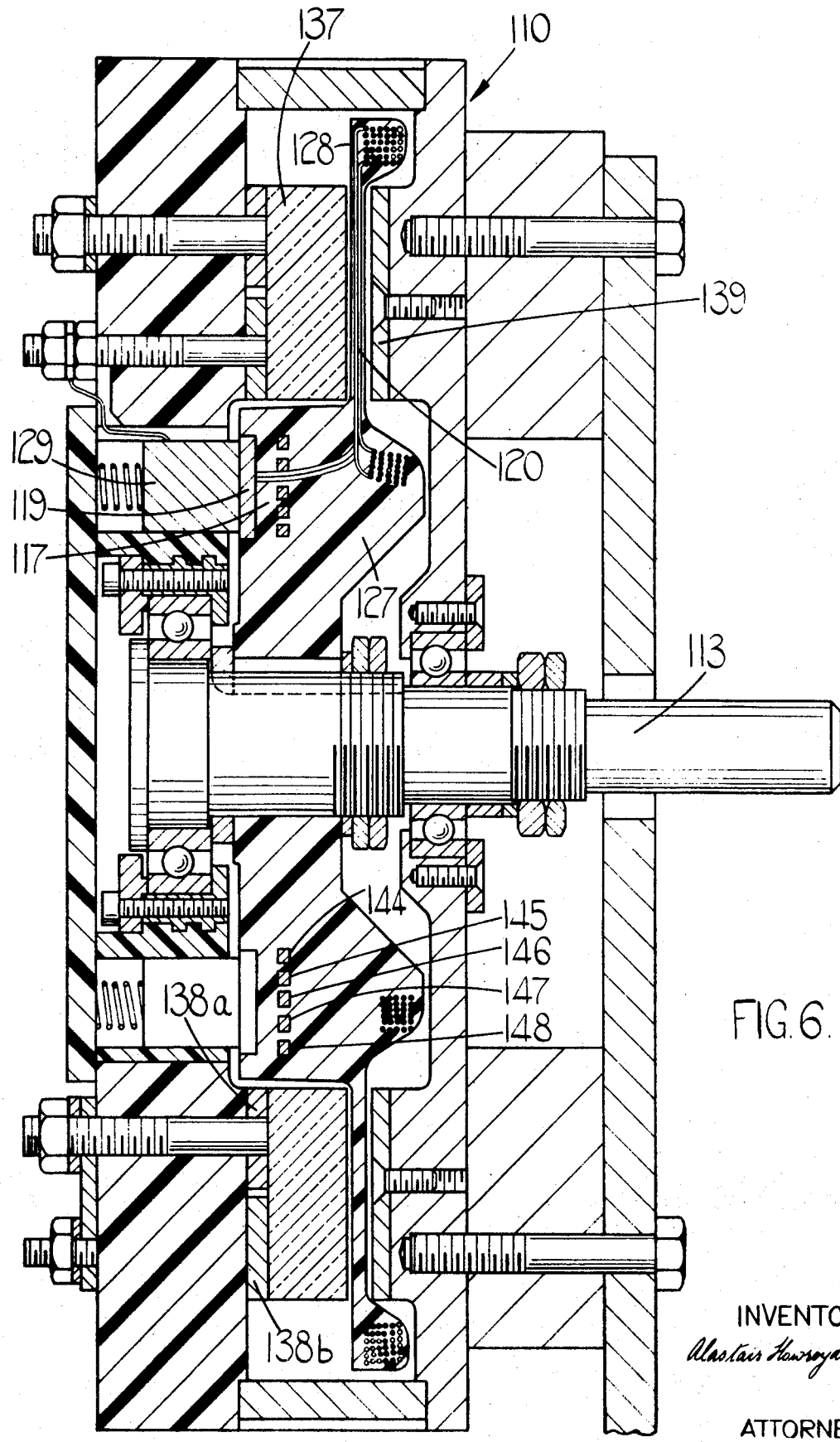
FIGS. 6 and 7 are sections along the lines of FIG. 1 but showing two other embodiments of the invention.

In the example shown in FIG. 6 (in which reference numerals of corresponding parts are 100 greater than those of FIGS. 1 to 5), the motor has a face type commutator 117 with axial brushes 129 instead of a drum-type commutator with radial brushes. The commutator segments 119 are formed by cutting radial slots across the face of a conductive ring after it has been bonded to the armature during the encapsulation thereof. The brushes 129 are of segmental section and are interconnected, not by the housing 10 and conductor 35 as in the first embodiment, but by the flux return ring of the magnets 137 (which are ceramic). This ring is, in fact, in two parts 138$^a$ and 138$^b$ to which the brushes are alternately connected by pigtails. There are, in fact, 60 of the coils 120 in this case and each has six turns of wire. The commutator 117 has 60 segments 119. The coils 120 are with the longer radial side underlying the shorter radial side of a coil spaced by four intervening coils. Each coil has its connecting wires (corresponding to wires 25 and 26) connected to adjacent commutator segments. The inner ring portion 127 contains five equalizing rings 144 to 148 and alternate commutator segments 119 are connected to these. Thus, if the segments 119 are successively assigned numbers 1 to 60, segments 1, 11, 21, 31, 41 and 51 are connected to ring 144, segments 3, 13, 23, 33, 43, and 53 are connected to ring 145 and so on.

Figure 7:
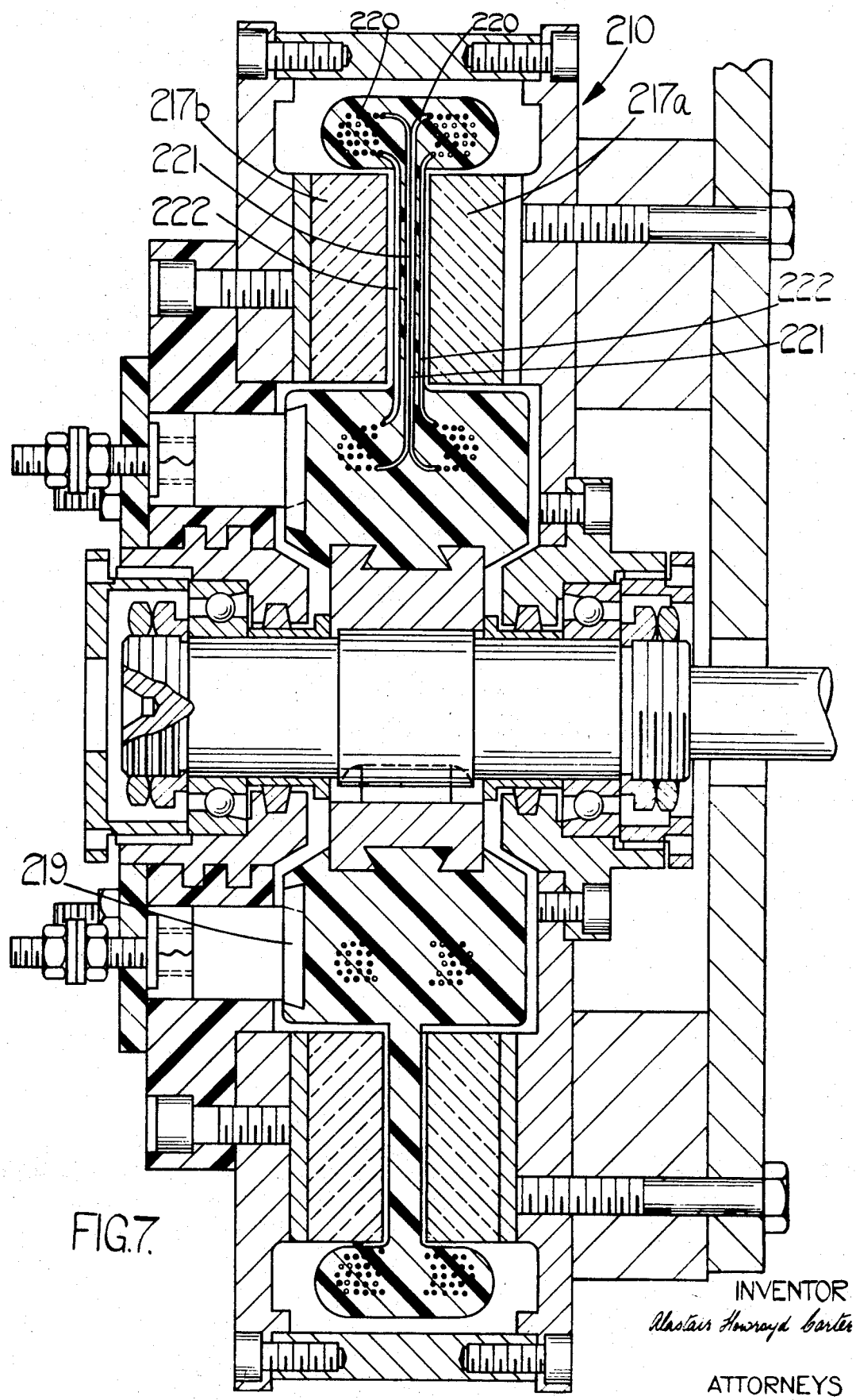

Dealing finally with FIG. 7 (in which the reference numerals are 200 higher than those of FIGS. 1 to 5) the motor has been made more powerful by utilizing an armature which includes two of the annular arrays of nesting coils used in the first two embodiments. These arrays are of opposite hand and are arranged so that there are four layers of wires (constituted by an end 22 and an end 222 of two coils 220 in each array) directly overlying one another.

In addition, there are two sets of ceramic magnets 217$^a$ and 217$^b$ in the housing 210. These are arranged so that for each magnet 217$^a$ on one side of the armature there is a magnet 217$^b$ presenting a pole face of opposite polarity to the opposite side of the armature. Each set of magnets is mounted on a return ring 238, 239.

In this case, the commutator 219 has 61 segments and there are 61 coils 220 in each annular array, with the corresponding coils of the two arrays being connected in parallel. Each has its two ends connected to commutator segments which are separated by nine intervening segments, whereas the longer end 221 of each coil underlies the shorter end 222 of a coil separated from the first-mentioned coil by four other coils in the array. A wave type winding is thus provided.

Having thus described my invention what I claim as new and desire to secure by Letters Patent is:

1. An electric motor comprising a housing, an armature disc rotatably supported for rotation about its axis relative to the housing, said armature incorporating a plurality of overlapping coils each comprising a plurality of turns in the plane of the disc, and a unitary encapsulating mass of synthetic resin material enclosing said coils, said encapsulating mass comprising an inner ring, a thin disc portion integral with the inner ring and an outer ring, said rings being of greater axial thickness than the thin disc portion, a commutator to which said inner ring is rigidly connected for support of the armature disc thereby, and comprising a plurality of segments to which the ends of the coils are connected, brush means carried by the housing and coacting with the commutator for the supply of current to the coils and a magnetic pole structure carried by the housing incorporating a plurality of permanent magnets of ceramic material mounted on a pair of spaced conductive magnetic rings which are connected to alternate brushes of the brush means, said magnets having pole face closely adjacent said thin disc portion of the armature disc and being magnetized so that the magnets present pole faces of alternate opposite polarity to the thin disc portion of the armature and a further magnetic ring mounted on the housing on the side of the armature remote from the magnets and closely adjacent the thin disc portion of the armature, to create a magnetic field such that the interaction between said field and the field set up by the coils when the current is supplied to the brush means causes torque to be applied to the armature disc.

2. An electric motor comprising, a housing, an armature disc supported for rotation on its axis relative to said housing, said armature disc including a plurality of coils each coil comprising a plurality of coplanar parallel wire turns and a pair of lead wires generally in the plane of the armature disc, said parallel wire turns disposed to form a pair of opposite sides of unequal length which extend substantially radially of the armature disc, and a pair of end portions interconnecting said sides and bent up out of the plane of said sides, the array of wires in said end portions being the same as that in said opposite sides so that the leads of each coil do not cross any wires and the wires in said end portions and sides do not cross each other, the coils nesting together in an annular array with the ends of each coil fitting between the ends of two other coils and with the shorter side of each coil directly overlying in apposition on the longer side of another coil which is separated from the first-mentioned coil in the annular array by a plurality of intervening coils, and a unitary encapsulating mass of synthetic resin material enclosing said coils, said encapsulating mass comprising inner and outer ring portions respectively enclosing the end portions of the coils and an integral thin disc portion of lesser axial thickness than the ring portions and enclosing the sides of the coils, a commutator rigidly connected to said inner ring of the armature disc and comprising a plurality of segments to which the coils are connected, brush means carried by the housing and co-acting with the commutator for the supply of current to the coils and a magnetic pole structure carried by the housing and having pole faces closely adjacent said thin disc portion of the armature disc to create a magnetic field such that interaction between said field and the field set up by the coils when current is supplied to said brush means causes torque to be applied to said armature disc.

3. An electric motor as claimed in claim 2 further comprising an additional identical annular array of nesting coils with radially extending sides of each coil in each array directed adjacent the corresponding radially extending sides of a corresponding coil in the other array, there being four layers of said radially extending sides in the thin disc portion of the armature disc encapsulating mass.

4. An electric motor as claimed in claim 3 in which the pole structure comprises two sets of permanent magnets, each set comprising a plurality of magnets with pole faces of alternate opposite polarity presented to the thin disc portion of the armature, the two sets being on opposite sides of the armature disc and corresponding magnets of the two sets presenting pole faces of opposite polarity to opposite sides of the same area of the thin disc portion.

* * * * *